3,136,687
HALOGENATED ALKYL SULFONE FUNGICIDES

William H. Hensley, Raleigh, N.C., John T. Fitzpatrick, Charleston, W. Va., and Dewayne C. Torgeson, White Plains, N.Y., assignors to Union Carbide Corporation, a corporation of New York
No Drawing. Filed Feb. 16, 1962, Ser. No. 173,802
9 Claims. (Cl. 167—22)

This invention relates to the control of fungi and to novel fungicidal compositions.

Soil-borne pathogenic fungi cause a variety of root-rots and wilts. Many agricultural soils, particularly those under intensive cropping, are heavily populated with these organisms. As in most cases satisfactory crop varieties resistant to these organisms are not available, large crop losses frequently result. For example, the Pythium, Fusarium, Verticillium, and Phymatotrichum root-rots and seedling diseases are known to substantially reduce the yield of such crops as corn, cotton, and banana.

Although chemicals have been used in limited fashion, such as in seed treatment, to control some soil-borne plant diseases, few effective general soil fungicides are known. The compounds employed in this invention have been found to provide excellent control of soil-borne pathogenic fungi.

The compounds contemplated for use as fungicides in the present invention are halogenated diethyl sulfones, wherein at least one of the four carbon atoms is substituted with chlorine, bromine, or iodine, preferably with chlorine or bromine.

Compounds exemplary of those for use in the invention are:

Bis(1-chloroethyl)sulfone,
Bis(1,2-dichloroethyl)sulfone,
Bis(1,2-dibromoethyl)sulfone,
Bis(1,2-diiodoethyl)sulfone,
Bis(1-bromo-2-chloroethyl)sulfone,
Bis(1-bromo-2-iodoethyl)sulfone,
Bis(1-chloro-2-bromoethyl)sulfone,
Bis(1-chloro-2-iodoethyl)sulfone,
Bis(1-iodo-2-chloroethyl)sulfone,
Bis(1-iodo-2-bromoethyl)sulfone,
1,2′-dichloro-1′,2-dibromodiethyl sulfone, and the like.

Particularly preferred for use in this invention are compounds of the formula

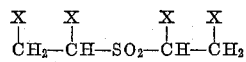

wherein each X individually is a chlorine or bromine atom.

The compounds used in this invention can be generally prepared by halogenating divinyl sulfone, as shown, for example, by Kretov in J. Russ. Phys.-Chem. Soc. 62, 1–29 (1930); by Alexander et al. in J. Chem. Soc., 1913–1918 (1931); and by Kliger in J. Gen. Chem. (USSR), 3, 904–908 (1933). To prepare compounds having different halide substituents, e.g. bromine and chlorine, in the same molecule, divinyl sufone can be simultaneously chlorinated and brominated, and the resulting reaction products separated by, e.g., fractional distillation.

The following examples are illustrative.

Example I

To a 500 milliliter, 4-neck flask equipped with a stirrer, thermometer, and diffuser feed system, and immersed in a cold bath, was charged a solution of 23.6 grams (0.2 mole) of divinyl sulfone in 300 milliliters of chloroform. Chlorine gas was fed through the diffuser feed system into the solution at a rate of about one gram per minute, while cooling and stirring the reaction mixture to maintain a constant reaction temperature of 0° C., until 28.4 grams (0.4 mole) of gas had been introduced. The reaction mixture was then stirred for an additional two-hour period at 0° C. to insure complete reaction. The reaction flask was exposed to sunlight throughout for catalysis. After the two-hour period, the reaction mixture was charged to a Claisen still and volatile material distilled off under reduced pressure to leave a substantially quantitative yield of bis(1,2-dichloroethyl)sulfone which had a 54.2 percent chlorine content by microanalysis; theory, 54.6 percent.

Example II

To a 500-milliliter, 4-neck flask equipped with a stirrer, thermometer, and feed tank, and immersed in a cold bath, was charged a solution of 23.6 grams (0.2 mole) of divinyl sulfone in 200 milliliters of chloroform. To this solution was added dropwise, over a period of one-half hour, a solution of 64 grams (0.4 mole) of bromine in 100 milliliters of chloroform while maintaining a constant reaction temperature of 0° C. by external cooling. The reaction mixture was then stirred for an additional two-hour period at 0° C. to insure complete reaction. The reaction flask was exposed to sunlight throughout for catalysis. After the two-hour period, the reaction mixture was charged to a Claisen still and volatile material distilled off under reduced pressure to leave a substantially quantitative yield of bis(1,2-dibromoethyl)sulfone which had a 74.1 percent bromine content by microanalysis; theory, 73.1 percent.

To evaluate the fungicidal activity of compounds representative to those contemplated for use in this invention, the following tests were carried out with bis(1,2-dichloroethyl)sulfone, hereinafter referred to as compound 1, and bis(1,2-dibromoethyl)sulfone, hereinafter referred to as compound 2.

Compounds 1 and 2 were formulated by dissolving one gram of compound in 50 milliliters of acetone in which had been dissolved 0.1 gram (10 percent of the weight of compounds) of "Triton X–155," an alkylphenoxy polyethoxyethanol surfactant, as an emulsifying or dispersing agent. The resulting solution was mixed into 200 milliliters of water to give roughly 250 milliliters of a suspension containing the compound in finely divided form. The thus-prepared stock suspension contained 0.4 percent by weight of compound.

The following tests were carried out.

Control of Pythium Damping-Off of Peas

Soil naturally infested with Pythium sp. was mixed and placed in 4-inch clay pots. Two pots were drenched with 75 milliliters of the above-described stock suspension for each compound tested to give dosages corresponding to the indicated rates in pounds of compound per acre. The thus-treated pots were covered with aluminum foil to prevent drying of the soil and incubated for two days at room temperature. Following the incubation period, each pot was seeded with 15 pea seeds as an indicator crop and then held in the greenhouse for about 15 days. After the 15-day period a count was made of the number of seedlings that had germinated in each pot. The effectiveness of each test compound at each concentration was rated according to its ability to control the fungi as evidenced by percent germination of seedlings. The following designations were used:

5=90–100 percent germination
4=70–89 percent germination
3=50–69 percent germination
2=25–49 percent germination
1=0–24 percent germination

Mycelial Growth Inhibition Test

*Fusarium oxysporum* f. *lycopersici* or *Sclerotium rolfsii*, as indicated below, were cultured on a corn meal-sand medium composed of 600 parts by volume of enriched degerminated yellow corn meal, 700 parts by volume of thoroughly washed white sand, and 500 parts by volume of distilled water. The culture medium was sliced into ¾-inch cubes which were autoclaved for thirty minutes at 15 pounds p.s.i.g. in Erlenmeyer flasks. Three-week old cultures were then used to infect sterilized soil by mixing about 750 cubic centimeters of culture medium cubes with one flat of sterilized soil and placing the thus-inoculated soil in paper cups. The cups were then drenched with thirty milliliters of the above-described stock suspension for each compound tested to give dosages corresponding to the indicated rates in pounds of compound per acre. The treated cups were then incubated for two days at 70° F. After the incubation period the effectiveness of each test compound was rated according to its ability to prevent mycelial growth of the fungus. The following designations were used:

5=no mycelial growth
4=scattered mycelial colonies
3=soil surface about one-half covered by mycelia
2=soil surface about three-fourths covered by mycelia
1=soil surface covered by mycelia The results of the above-described tests are set forth in Table I, below. Control tests carried out as above but without addition of test compound resulted in ratings of 1 for all tests.

TABLE I

| Test | Rate (pounds per acre) | Compound 1 | Compound 2 |
|---|---|---|---|
| Pythium damping-off of peas | 150 | 4 | |
| | 75 | 4 | |
| *Fusarium oxysporum* f. *lycopersici* | 150 | 5 | 5 |
| | 75 | 4 | |
| *Sclerotium rlfsii* | 150 | 5 | |

In order to evaluate the effectiveness of compound 1 under actual field conditions, the following field tests were carried out.

Control of Clubroot of Cabbage

Compound 1 was applied to soil plot naturally infested with *Plasmodiophora brassicae* in a cabbage field in the Eastern United States three days prior to planting of the cabbage. Six weeks after application of the chemical the cabbage was harvested and yields of crop recorded. Yields of crop were also recorded in an untreated control plot. The results were as follows:

| | Rate (pounds/acre) | Yield [a] |
|---|---|---|
| Compound 1 | 75 | 54.9 |
| | 37 | 47.1 |
| Control | | 9.0 |

[a] Yield in pounds of crop from equal-size plots.

Examination of the roots of the harvested cabbage showed that compound 1 provided good control of clubroot.

Control of Tobacco Black Shank

Compound 1 was applied to soil naturally infested with *Phytophthora parasitica* var. *nicotianae*, in a tobacco field in the Southeastern United States, one day prior to planting or setting of the tobacco, North Carolina variety 401. Application was made using a tractor-mounted, low-pressure weed sprayer with two nozzles mounted for single-row treatment so that the first nozzle sprayed into the furrow after it was opened and the second nozzle sprayed onto the soil as it was moved back into place and ridged. Observations of stand were made at times after planting as indicated and are expressed as the number of healthy plants of 20 plants originally planted. The results were as follows:

| | Rate in pounds per acre | Number of healthy plants, days after setting | |
|---|---|---|---|
| | | 25 | 48 |
| Compound 1 | 40 | 17.6 | 13.8 |
| | 20 | 16.6 | 11.6 |
| | [a] 20 | 13.8 | 10.4 |
| Control | | 9.0 | 5.2 |

[a] Field was rotovated after application

The compounds used in this invention may be applied as fungicides according to methods known to those skilled in the art. Fungicidal compositions containing the compounds as the active toxicant will usually comprise a carrier, either liquid or solid.

Suitable liquid carriers include water, petroleum distillates or other liquid carriers with or without surface active agents. Liquid concentrations may be prepared by dissolving one of these compounds with a solvent such as toluene, xylene or kerosene and dispersing the toxicants in water with the aid of suitable surface active dispersing agents. The choice of dispersing and emulsifying agent and the amount employed is dictated by the nature of the composition and the ability of the agent to facilitate the dispersion of the toxicant compound. Dispersing and emulsifying agents which may be employed include the condensation products of alkylene oxides with phenols and organic acids, alkyl aryl sulfonates, complex ether alcohols, mahogany soaps, sodium, potassium or calcium alkylaryl sulfonates, and quaternary ammonium compounds.

In the preparation of wettable powder or dust compositions, the active ingredient is dispersed in and on a finely divided inert solid carrier such as clay, talc, chalk, bentonite, fullers earth, and the like. In the formulation of the wettable powders the aforementioned dispersing agents can be included.

The required amount of the toxicant compounds may be supplied, per acre treated, in from about 5 to about 200 gallons or more of liquid carrier or in from about 50 to about 1000 pounds of inert solid carrier. The concentration of the toxicant in the liquid concentrate will usually vary from about 10 to about 95 weight percent and in the solid formulations from about 0.1 to about 95 weight percent.

The fungicidal compositions can be applied to the soil by surface spraying and subsequent mechanical turning-over of the surface soil or by application of the formulation around the base of the crop plant at setting. In some cases, a waiting period between treatment of the soil with fungicide and subsequent planting or setting is advantageously provided.

What is claimed is:

1. A method for combating soil-borne pathogenic fungi which comprises applying to the fungi a compound of the formula $$\underset{CH_2-CH-SO_2-CH-CH_2}{\overset{X\phantom{xx}X\phantom{xxxx}X\phantom{xx}X}{|\phantom{xx}|\phantom{xxxx}|\phantom{xx}|}}$$

wherein each X individually is selected from the group consisting of chlorine and bromine.

2. A method for combating soil-borne pathogenic fungi which comprises applying to the fungi bis(1,2-dichloroethyl)sulfone.

3. A method for combating soil-borne pathogenic fungi which comprises applying to the fungi bis(1,2-dibromoethyl)sulfone.

4. A method for combating soil-borne pathogenic fungi which comprises applying to the fungus-infested soil a compound of the formula $$\underset{CH_2-CH-SO_2-CH-CH_2}{\overset{X\ \ \ X\ \ \ \ \ \ \ X\ \ \ X}{|\ \ \ |\ \ \ \ \ \ \ |\ \ \ |}}$$

wherein each X individually is selected from the group consisting of chlorine and bromine.

5. A method for combating soil-borne pathogenic fungi which comprises applying to the fungus-infested soil bis-(1,2-dichloroethyl)sulfone.

6. A method for combating soil-borne pathogenic fungi which comprises applying to the fungus-infested soil bis-(1,2-dibromoethyl)sulfone.

7. A method for rendering soil resistant to infestation by pathogenic fungi which comprises applying to the soil a compound of the formula $$\underset{CH_2-CH-SO_2-CH-CH_2}{\overset{X\ \ \ X\ \ \ \ \ \ \ X\ \ \ X}{|\ \ \ |\ \ \ \ \ \ \ |\ \ \ |}}$$

wherein each X individually is selected from the group consisting of chlorine and bromine.

8. A method for rendering soil resistant to infestation by pathogenic fungi which comprises applying to the soil bis(1,2-dichloroethyl)sulfone.

9. A method for rendering soil resistant to infestation by pathogenic fungi which comprises applying to the soil bis(1,2-dibromoethyl)sulfone.

References Cited in the file of this patent
UNITED STATES PATENTS

| | | |
|---|---|---|
| 2,127,400 | Gibbs | Aug. 16, 1938 |
| 2,858,341 | Dole | Oct. 28, 1958 |
| 2,959,517 | Bowers et al. | Nov. 8, 1960 |
| 2,979,435 | Raasch | Apr. 11, 1961 |
| 3,051,757 | Johnston | Aug. 28, 1962 |